(12) United States Patent
Saad et al.

(10) Patent No.: US 7,581,206 B2
(45) Date of Patent: Aug. 25, 2009

(54) SYSTEMS AND METHODS FOR CREATING AND PROVIDING TEMPLATES IN A SINGLE FILE

(75) Inventors: Stephanie S. Saad, Kirkland, WA (US);
Chad W. Royal, Redmond, WA (US);
Craig A. Skibo, Sammamish, WA (US);
Stephen L. Rakonza, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 492 days.

(21) Appl. No.: 11/035,587

(22) Filed: Jan. 14, 2005

(65) Prior Publication Data

US 2006/0161881 A1 Jul. 20, 2006

(51) Int. Cl.
*G06F 9/44* (2006.01)
(52) U.S. Cl. .................................. 717/106; 717/104
(58) Field of Classification Search ................. 717/104, 717/106
See application file for complete search history.

(56) References Cited

U.S. PATENT DOCUMENTS

| | | | |
|---|---|---|---|
| 5,729,748 | A | 3/1998 | Robbins et al. |
| 6,427,228 | B1 | 7/2002 | Wigger |
| 2003/0105778 | A1 | 6/2003 | Andani |
| 2005/0057560 | A1 | 3/2005 | Bibr et al. |
| 2005/0071805 | A1* | 3/2005 | Lauterbach et al. ......... 717/104 |
| 2005/0114381 | A1 | 5/2005 | Borthakur et al. |
| 2005/0138558 | A1 | 6/2005 | Duevel et al. |
| 2005/0198100 | A1 | 9/2005 | Goring et al. |
| 2006/0080329 | A1* | 4/2006 | Skibo et al. ................. 707/100 |
| 2006/0161880 | A1 | 7/2006 | Saad et al. |
| 2007/0033088 | A1 | 2/2007 | Aigner et al. |
| 2007/0150855 | A1* | 6/2007 | Jeong ........................ 717/106 |

OTHER PUBLICATIONS

In the United States Patent and Trademark Office, Non-Final Office Action, In re:. U.S. Appl. No. 11/035,586, filed Jan. 14, 2005, Dated Sep. 4, 2008, 11 pages.
Boisson, C. et al., "Template Generation for Identifying Text Patterns", Foundations of Intelligent Systems, 12th International Symposium, ISMIS 2000 Proceedings, Oct. 11-14, 2000, 463-473.
Handschuh, S. et al., "CREAM: Creating Metadata for the Semantic Web", Computer Networks, 2003, 42(5), 579-598.
Lei, L. et al., "Design and Implementation of a Report-Component Generating System Based on Software Reuse", Mini-Micro Systems, 2003, 24(4), 739-743.
Mukherjee, S. et al., "Automatic Discovery of Semantic Structures in HTML Documents", Proceedings Seventh International Conference on Document Analysis and Recognition, Edinburgh UK, Aug. 3-6, 2003, 1, 245-249.
Postnikov, V.V., "Identification and Recognition of Documents with a Predefined Structure", 6th International Conference on Pattern Recognition and Image Analysis: New Information Technologies, Oct. 21-26, 2002, 13(2), 332-334.
Zdun, U., "Dynamically Generating Web Application Fragments from Page Templates", Specification of Software Systems, SAC, 2002, Madrid, Spain, 1113-1120.
Pyron, T., Special Edition Using Microsoft Project, Que, 2002, 19 pages.

* cited by examiner

*Primary Examiner*—Wei Y Zhen
*Assistant Examiner*—Junchun Wu
(74) *Attorney, Agent, or Firm*—Woodcock Washburn LLP

(57) ABSTRACT

A user can package one or more file(s) into a group and specify that the group is to be converted into a template. An IDE process can automatically index the content of the group and create a metadata file to represent the indexed content. The indexed file group and metadata can serve as a template for creating new files with properties of the original file(s). Completed templates are packaged together in one file such as a .zip file. Completed templates can be added to a User Interface (UI) accessible location, such as a collection of templates accessible to UI dialog processes for opening new files. The metadata file authored in a declarative programming language such as XML.

16 Claims, 9 Drawing Sheets

SYSTEMS AND METHODS FOR CREATING AND PROVIDING TEMPLATES IN A SINGLE FILE

CROSS-REFERENCE TO RELATED APPLICATIONS

This application is related to the following commonly-assigned patent application, the entire contents of which are hereby incorporated in this present application by reference: U.S. patent application Ser. No. 10/961,753, entitled "SYSTEMS AND METHODS FOR CREATING A TEMPLATE FROM AN EXISTING FILE", filed Oct. 8, 2004.

This application is related to the following commonly-assigned patent application: U.S. patent application Ser. No. 11/035,586, entitled "SYSTEMS AND METHODS FOR CREATING AND PROVIDING TEMPLATES IN A SiNGLE FILE", filed Jan. 14, 2005.

FIELD OF THE INVENTION

This invention relates to computing, and more particularly to the use of document templates for speedy creation of files with a plurality of desired properties, and more particularly to the facilitated generation of customized templates.

BACKGROUND OF THE INVENTION

The use of file templates has become commonplace for computer users in variety of applications in which users create and save data in a file. File templates allow a user to create a new file with a readymade set of initial properties, instead of starting work on a new file from scratch. One common template is a letter template in a word processing program, such as MICROSOFT WORD®. A user of such a template may first select the appropriate template, which operates to create a new file with desirable file properties. The user may then be prompted to enter data into several fields. For example, the user may fill in an address field, a date field, a salutation field, and so on. After inserting data into the fields, the user may go on to add additional content to the letter, and save it to a desired location. There are presently many kinds of templates available. Letters, resumes, memos, and so forth are commonly created from word processing application templates, while web pages of various styles are created from templates in webpage editing software, and various files created for software applications are generated from templates in Integrated Development Environments (IDEs).

More particularly, with reference to IDE's, note that most modern software is typically created with a great deal of computer automated assistance. Such assistance is commercially available through any of a number of IDEs. For example, MICROSOFT'S VISUAL STUDIO®, BORLAND'S C++ BUILDER®, METROWERK'S CODE WARRIOR®, and IBM'S WEBSPHERE STUDIO® are all products presently available to assist in software creation. Such products provide a range of useful functions, such as templates for creating new files, that may be subsequently adapted to the particular needs of an undertaking. Other IDE functions include coordinating communications between multiple developers working together on large applications, assisting in the actual writing of source code, assisting in specifying how a source code file will be compiled, and providing compilers and other processes that convert source code files and the like into executable files.

While many IDE users are familiar with and commonly use templates, fewer IDE users create their own templates for later use. This is at least in part because the creation of templates in modern IDEs is time-consuming, difficult, and error prone. It involves the creation of at least two, if not more, separate files to instruct a template building engine in the details of desired template properties. A first file may point to a template wizard dialog process which allows user insertion of file properties. A second file provides the code for placing and formatting the user-entered data into the document created from the template. Because the second file is javascript code and not written in an easily debuggable language such as compiled code, such authored templates are difficult to debug and therefore difficult to author.

The difficulty of creating custom templates in modern IDEs is particularly troublesome in light of the working needs of modern software developers. Developers are a group of computer users who uniquely benefit from the use of templates. Developers understand the details of their own work better than the properties of a factory-provided template. Developers may often work on related software projects, or improvements and optimizations of past projects, that lend themselves to re-use of previously developed code. Redundant coding is highly inefficient and can be frustrating for developers as they reconsider problems that may have already been thought through.

Perhaps more importantly, leveraging past work without a template can be error-prone. When a previously developed file is re-used, the properties of the file must be uniformly updated, or the resulting software may not operate properly. Thus, developers are a group of computer users that derive particular advantage from the use of templates, so the ability to efficiently create new, custom templates is a feature of great advantage in IDE software.

Two of the most important features in templates which are used inside any program are the ability to easily exchange and easily author templates. For some applications, objects naturally lend themselves to being a single file. MICROSOFT WORD® is an example of such an application. Template creation and exchange is simplified. All the data and metadata for the template is stored in a single file, (e.g., the_.dot file for MICROSOFT WORD®). However, developer templates are by nature hard to author and exchange. For developers, template authoring and exchange is equally if not more important than for other application types. Leveraging existing code and the work of others is a common productivity practice in the development industry. Developers frequently leverage each others' code to build iteratively more complex and fully functional applications. Templates are a key part of this process. They serve a variety of functions: (1)starting points for essential building blocks such as UI-based applications or libraries; (2) fully functional applications which can be taken by others and customized to meet particular customer needs (ex: website samples); (3) building block libraries or functions which are written by one architect inside a development team and then leveraged for a variety of applications; (4) outlines of key best practices for writing code blocks which are written by senior devs and leverage by junior devs in a team development environment. Templates may contain (as a list of examples and not a complete rendering): (1) code blocks; (2) build settings; (3) re-usable components or libraries. These templates then appear in the New Project and/or Add New Item and or/New File dialogs in VISUAL STUDIO®, for example, for the user to create new projects/add files to his/her project. Code Projects are in format inherently complex on disk. They usually contain some form of metadata build settings file, code files, and may additionally contain documentation, graphical or string resources, etc. Template creation is also necessarily a user-customizable process; authors may wish to see certain files opened/closed in the IDE on create, customize whether the user is prompted to enter a name, use the user-entered name to name certain items (files, classes, etc.) in the created project, show custom UI to gather information and customize the build configuration, etc.

Therefore, there is a need in the art to support the ability of developers to be able to both easily author templates and to be able to easily exchange them in a single file format.

SUMMARY OF THE INVENTION

Various embodiments of the present invention are directed to systems and methods for creating and providing templates in a single file. More specifically, various embodiments of the present invention are directed to providing templates that are created based upon current saved projects or files and provide for easy modification and transfer of the templates from one user to another.

For several embodiments of the present invention a method for generating a template for creating data is provided comprising first providing data upon which the template will be based and then creating a metadata file associated with the template and the data, wherein the file is coded at least in part in a declarative programming language. The data and the associated metadata file are packaged into a single transferable file.

Various embodiments of the present invention may also be characterized as method for using templates having associated metadata files, the method comprises parsing all the metadata files, building an index of all the templates, displaying the index, selecting a template from the index, reading a metadata file associated with the selected template, creating new data based on information read in the metadata file, and making said new data available for use in a software application.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor(s) has (have) contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Enviornment

Figure 1A:
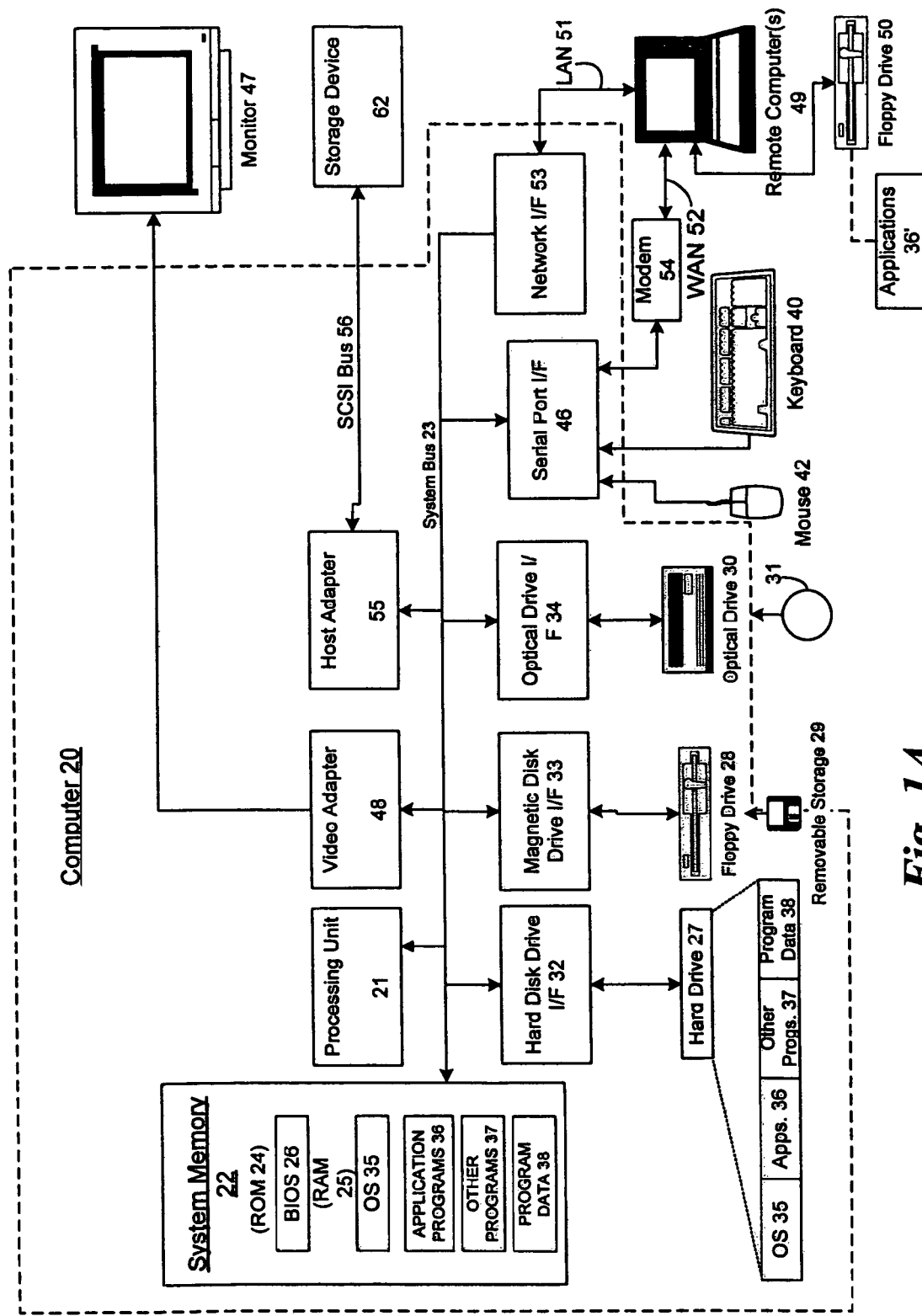
FIG. 1A is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 331 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Figure 1B:
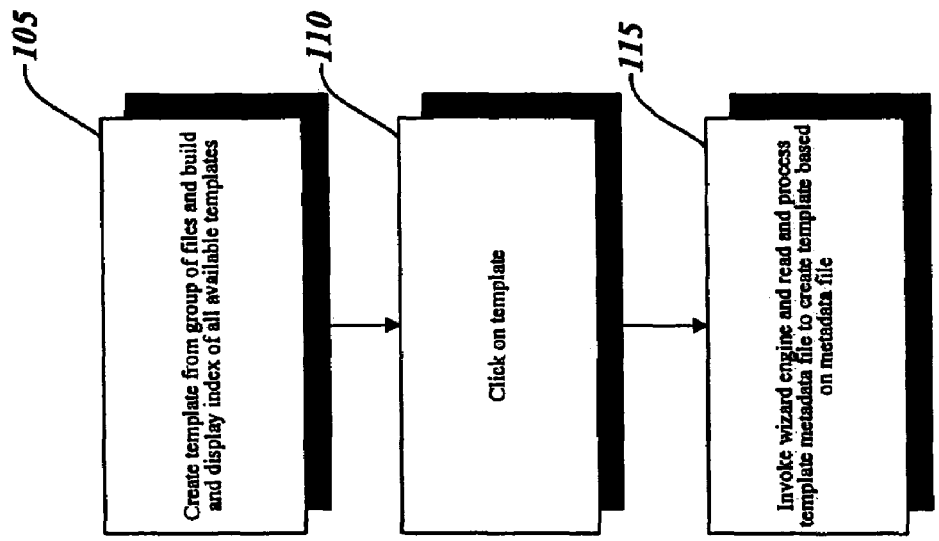
FIG. 1B is a process flow diagram that shows a process of creating and opening a template according to several embodiments of the invention.

Referring next to FIG. 1B, shown is a process flow diagram illustrating a high level view of a process of creating and opening a template according to several embodiments of the invention. First, a template is created 105 from a group of files. Usually, these files are associated with each other such as those that may comprise a project or a particular item. Also, an index of templates is built and displayed 105 in a user interface so that they may be individually selected by a user. A user then clicks on the template 110 he or she wishes to open. Then a wizard engine is invoked 115 to read the metadata file associated with the template to create a new project based on the selected template.

Figure 2:
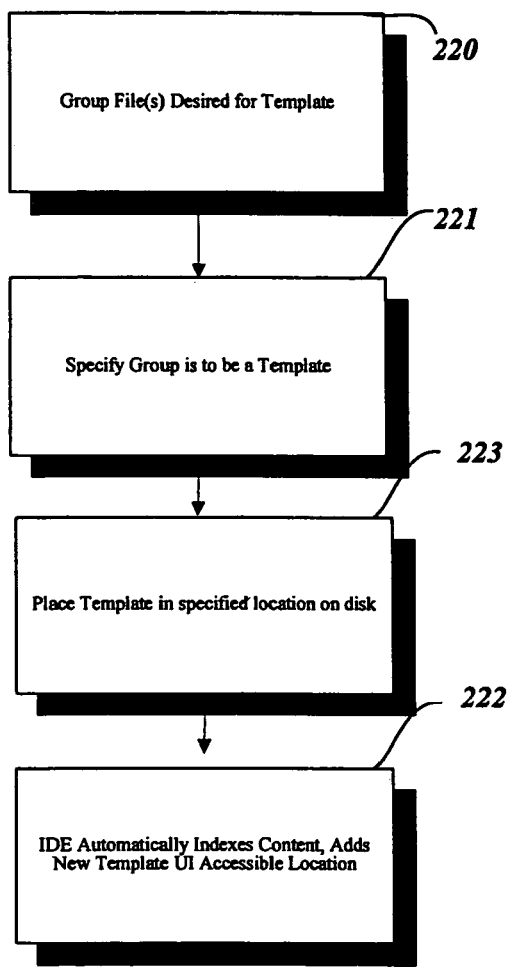
FIG. 2 illustrates a more detailed view of the first step of FIG. 1B, providing an interaction sequence between a user and an Integrated Development Environment (IDE) when the user creates a template from an existing file using embodiments of the systems and/or methods of the invention.

Referring next to FIG. 2, illustrated is a more detailed view of the first step of FIG. 1B, providing an interaction sequence between a user and an Integrated Development Environment (IDE) when the user creates a template from an existing file using embodiments of the systems and/or methods of the invention. Three steps 220, 221, 222 and 223 are illustrated to provide an example of the use of embodiments of the invention. There are any number of implementations that may allow a user to create a template using the three steps 220, 221, 222, 223 shown here. Some of these implementations are described in detail herein. The three steps are, first, for a user to group any files together that he wishes to include in a template 220. Second, the user may specify that that the file or file group is to be stored as a template 221. Then the template is placed 223 in specified location on disk. Finally, the IDE automatically indexes the group and adds a new template to a collection of templates 222. By allowing users to create new templates through these simple steps, embodiments of the invention greatly facilitate the creation of templates.

Referring first to the first step 220 of FIG. 2, a typical situation in which files will be grouped for conversion into a template involves a project or comparable group of files in MICROSOFT VISUAL STUDIO®, or comparable IDEs. Many IDEs have projects or their equivalent. A project is a file or plurality of files that cooperate to accomplish a unified set of application functions. In general, if a template is to be created from a project, the "project file" within the project, i.e., the file that operates to bind the various code files together, must be valid.

A typical situation in which it may be desirable to convert a single file into a template involves an item in MICROSOFT VISUAL STUDIO®, or comparable IDEs. Many IDEs have items or their equivalent. An item is a file that contains information such as code that accomplishes some discrete unit of functionality. In general, if a template is to be created from an item, it may be desirable to restrict the number of files in a group to one.

Figure 8:
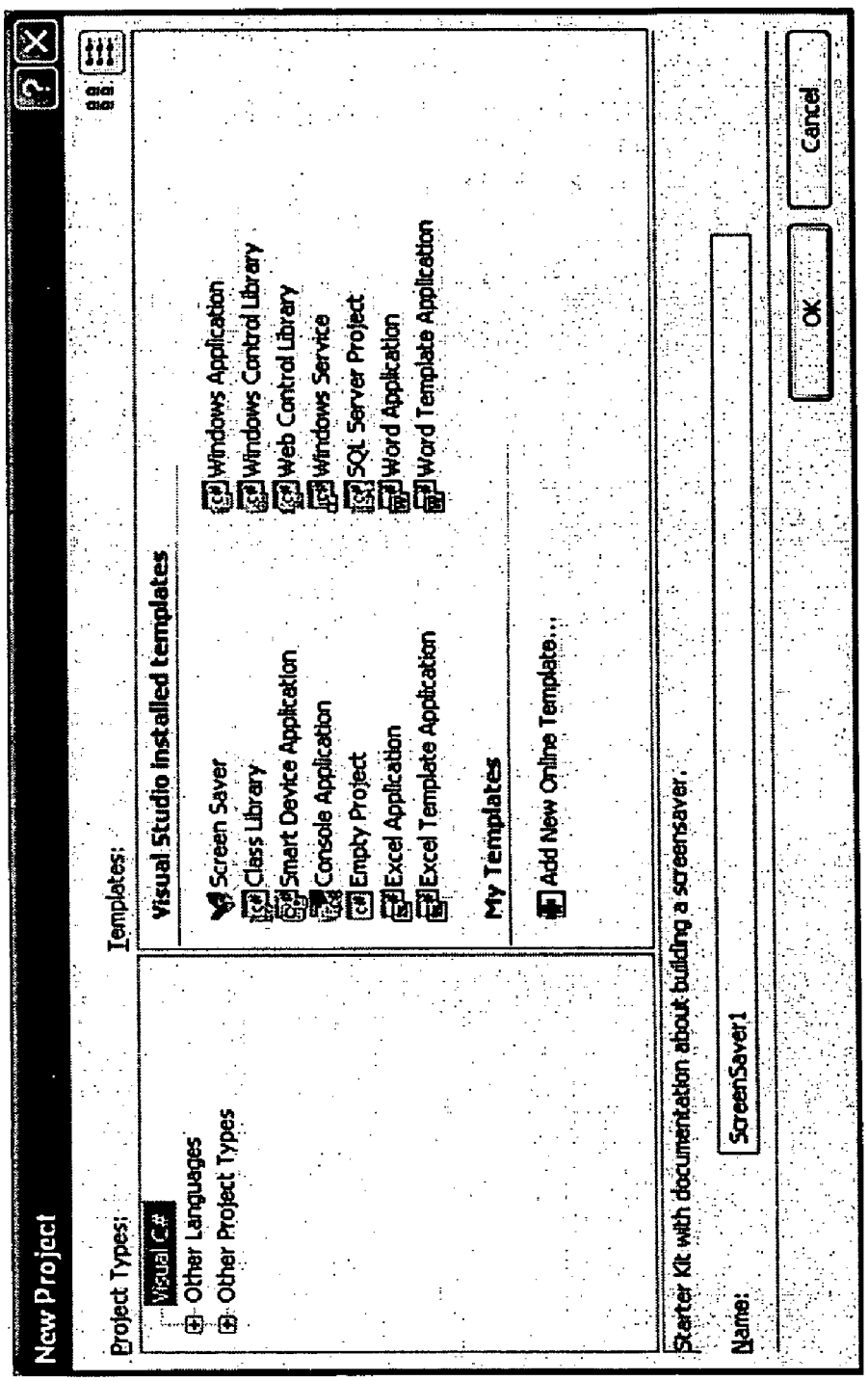
FIG. 8 is an exemplary screenshot of the New Project Dialog of MICROSOFT VISUAL STUDIO® according to an embodiment of the present invention.

Project templates and item templates are both comprised of a single metadata file (e.g., .VSTEMPLATE metadata file) and the constituent file(s) for the project or item. These files are grouped into a single file such as a .zip file, for example. The metadata file is the main component of the template. It contains all of the metadata for how the template appears in the user interface such as the New Project dialog in MICROSOFT VISUAL STUDIO®, for example. FIG. 8 is an exemplary screenshot of the New Project Dialog of MICROSOFT VISUAL STUDIO® according to an embodiment of the present invention. However, other user interfaces that provide a way to choose a template may also be used. The metadata file also contains information pertaining to how the template should be categorized and what options are employed during template instantiation. An exemplary format for a project template is as follows:

Template metadata file which contains metadata about the template. Project file. The project is a working project which contains items as they will appear in the instantiated project.

Project Item files Optional icon file for display in the user interface The above files are grouped into a single file such as a .zip file, for example. The format for an item/file template is as follows:

Template metadata file which contains metadata about the template.
I—Item file
Optional icon file for display in the user interface The above files are grouped into a single file such as a .zip file, for example. The template metadata file is authored in a declarative programming language such as Extensible Markup Language (XML), for example. The template metadata file describes the content and creation process for the template. It comprises two main sections:

<TemplateData>: defines the appearance of the template
<TemplateContent>: defines the content and creation parameters of the template The following is an example of a metadata file written in XML following the format above for a console application written in the CSharp programming language:

```xml
<VSTemplate Version="2.0.0" Type="Project"
xmlns="http://schemas.microsoft.com/developer/vstemplate/2005"
xmlns:xsi="http://www.w3.org/2001/XMLSchema-instance"
xsi:schemaLocation="http://schemas.microsoft.com/developer/vstemplate/2005">
    <TemplateData>
        <Name Package="{FAE04EC1-301F-11d3-BF4B-00C04F79EFBC}" ID="2320" />
        <Description Package="{FAE04EC1-301F-11d3-BF4B-00C04F79EFBC}" ID="2321" />
        <Icon Package="{FAE04EC1-301F-11d3-BF4B-00C04F79EFBC}" ID="4548" />
        <ProjectType>CSharp</ProjectType>
        <SortOrder>70</SortOrder>
        <NumberOfParentCategoriesToRollUp>1</NumberOfParentCategoriesToRollUp>
        <CreateNewFolder>true</CreateNewFolder>
        <DefaultName>ConsoleApplication</DefaultName>
        <ProvideDefaultName>true</ProvideDefaultName>
    </TemplateData>
    <TemplateContent>
        <Project File="ConsoleApplication.csproj" ReplaceParameters="true">
            <ProjectItem ReplaceParameters="true"
TargetFileName="Properties\AssemblyInfo.cs">AssemblyInfo.cs</ProjectItem>
            <ProjectItem ReplaceParameters="true" OpenInEditor="true">Program.cs</ProjectItem>
        </Project>
    </TemplateContent>
</VSTemplate>
```

Copyright© Microsoft Corp

The following is an example of a metadata file written in XML following the format above for a form written in the CSharp programming language:

```xml
<VSTemplate Version="2.0.0" Type="Item"
xmlns="http://schemas.microsoft.com/developer/vstemplate/2005"
xmlns:xsi="http://www.w3.org/2001/XMLSchema-instance"
xsi:schemaLocation="http://schemas.microsoft.com/developer/vstemplate/2005">
    <TemplateData>
        <Name Package="{FAE04EC1-301F-11d3-BF4B-00C04F79EFBC}" ID="2237" />
        <Description Package="{FAE04EC1-301F-11d3-BF4B-00C04F79EFBC}" ID="2264" />
        <Icon Package="{FAE04EC1-301F-11d3-BF4B-00C04F79EFBC}" ID="4535" />
        <ProjectType>CSharp</ProjectType>
        <SortOrder>40</SortOrder>
        <DefaultName>Form.cs</DefaultName>
    </TemplateData>
    <TemplateContent>
        <References>
            <Reference>
                <Assembly>System, Version=2.0.0.0, Culture=neutral, PublicKeyToken=b77a5c561934e089</Assembly>
            </Reference>
            <Reference>
                <Assembly>System.Data, Version=2.0.0.0, Culture=neutral, PublicKeyToken=b77a5c561934e089</Assembly>
            </Reference>
            <Reference>
                <Assembly>System.Drawing, Version=2.0.0.0, Culture=neutral, PublicKeyToken=b03f5f7f11d50a3a</Assembly>
            </Reference>
            <Reference>
                <Assembly>System.Windows.Forms, Version=2.0.0.0,
```

```
Culture=neutral, PublicKeyToken=b77a5c561934e089</Assembly>
    </Reference>
    <Reference>
        <Assembly>System.Xml, Version=2.0.0.0, Culture=neutral,
PublicKeyToken=b77a5c561934e089</Assembly>
    </Reference>
  </References>
  <ProjectItem ReplaceParameters="true" SubType="Form">Form.cs</ProjectItem>
  <ProjectItem ReplaceParameters="true">Form.Designer.cs</ProjectItem>
  </TemplateContent>
</VSTemplate>
```

Copyright© Microsoft Corp

Although it is not required to have the metadata file in XML, there are several advantages to having the metadatafile coded in XML or a similar language. XML provides XML Schema Definition (XSD) which is a way to describe and validate data in an XML environment. The XSD will be published to enable successful template authoring. Using XML helps to enable the template file format to be intuitive and easy to understand. Also, users are able to take existing templates shipped with an IDE program and customize them as desired to suit their needs. Templates in different formats, from previous versions of an IDE, for example, may continue to work without requiring modification.

In creating a template, there are any number of ways to associate a plurality of files, such as those of a project or item, in step 220. Various embodiments may allow a user to package the project or item as a ZIP file, which is a widely available compressed file format. Other ways to associate multiple files comprise placing them in a single folder, naming them with a common identifying string, and so forth. When a group is formed using the method of "ZIP"ing the various files of the group into a single ZIP file, it may be preferable in various embodiments to use a single ZIP file as an umbrella for all files that are to be converted to a template.

Referring next to the second step 221 of FIG. 2, the user can specify that the group of files is to be converted into a template. In preferred embodiments, this action can comprise placing the group in one of a set of pre-defined directories. For instance, there may be a directory that is identified as "convert to template," "templates," "new templates," "custom templates," or the like. The action of placing the group in the directory can operate to instruct a process in the IDE to create a template from the group. Of course, any number of techniques may be used to specify that the group should be made into a template. For example, the files could be highlighted and a menu item such as "convert to template" could be selected from a plurality of options provided in an IDE Graphical User Interface (GUI). Alternatively, a dialog could be provided into which the names and/or file paths of the file(s) of the group could be entered. These are but a few suggestions out of many possible options for specifying that a template is to be made using file(s) of a template group.

Figure 3:
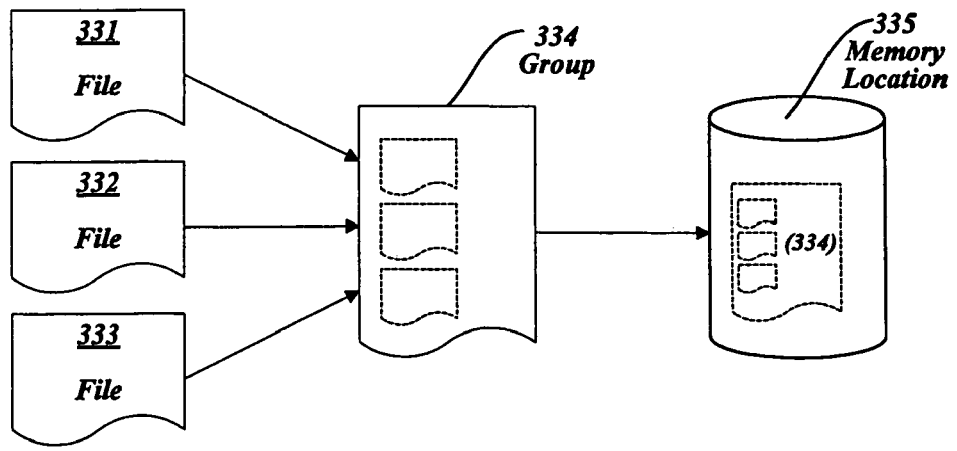
FIG. 3 provides a graphical representation of the first two steps from FIG. 2.
Figure 4:
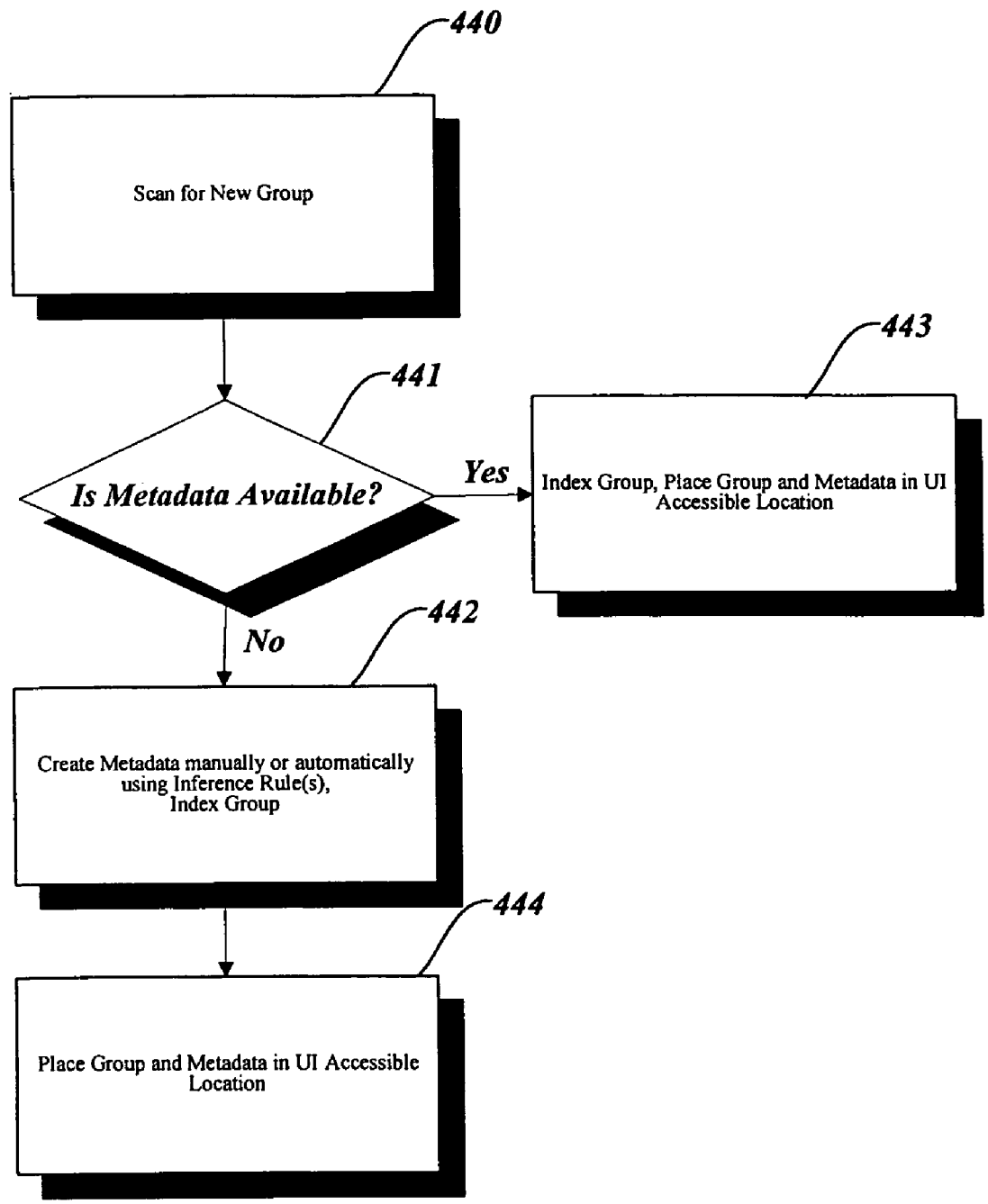
FIG. 4 illustrates a more detailed view of available methods for carrying out the third step in FIG. 2.
Figure 5:
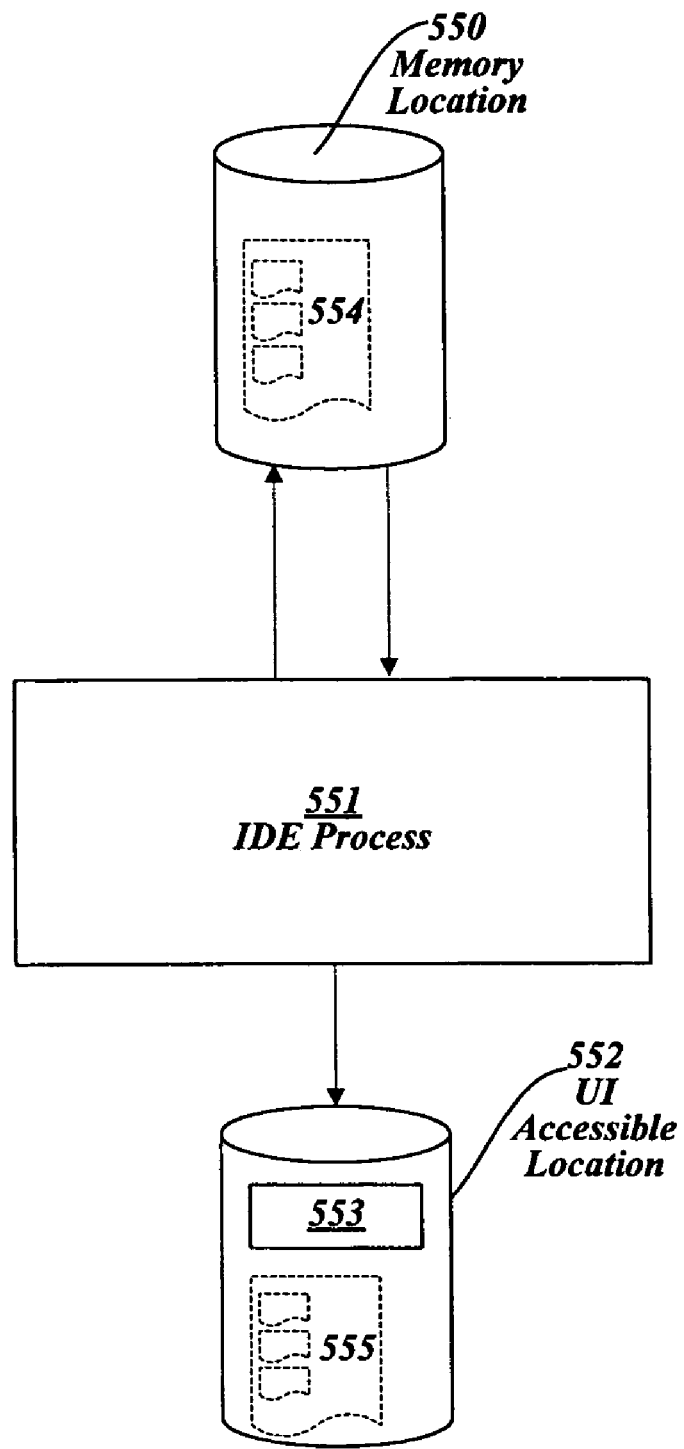
FIG. 5 provides a graphical representation of the steps in FIG. 4.

Embodiments of the invention allow the user to take the first two steps 220 and 221, while an automated process can take the final step 222. FIG. 3 provides a graphical representation of the first two steps, 220 and 221. FIG. 4 and FIG. 5 present a more detailed view of step 222.

Referring to FIG. 3, files 331, 332, and 333 represent files that are grouped by a user into group 334. 331, 332, and 333 may represent a project in VISUAL STUDIO® or comparable set of files. In embodiments where only one file is converted to a template, that single file, e.g., 331, could be the only file in group 334 (contrary to the illustrated embodiment). Group 334 may be a ZIP file that contains files 331, 332, and 333. In various embodiments, a user may specify that group 334 is to be converted to a template by placing the group in memory location 335. Memory location 335 may be, for example, a predetermined directory location that is periodically scanned by an IDE process for new file groups. The IDE process (not illustrated in FIG. 3) may detect the group 334 in the memory location 335 and trigger the conversion of the group 334 into a template. Various embodiments for this operation are discussed with reference to FIG. 4 and FIG. 5.

Referring back to FIG. 2, the third step 222 may be carried out by one or more automatic processes associated with an IDE. These IDE processes may be occasionally referred to herein as a template engine. The template engine may provide a variety of functions relating to creating and/or utilizing templates. First, it may create templates by indexing the content of a group and creating one or more metadata files representing the indexed information. Second, the template engine may assist a user in utilizing a template by creating a new file from a template. The template engine may instantiate a new file or group of files from the indexed content and metadata, prompt a user to enter data for the new file or group, and insert the entered data, as necessary, throughout a newly created file or group.

As alluded to above, the template engine processes associated with step can be performed in response to an indication that a group is to be used as a template, as in step 221. For example, in embodiments where users can optionally create templates by placing a group on disk in one or more directories for user-added templates, the actions of indexing group content and placing the generated template in a UI accessible location may be taken in response to placement of a group in the directory location. In these embodiments, a user may simply save an existing project, for example, in a ZIP format and place the ZIP file on disk in a correct directory location. The ZIP file can be automatically picked up by the template engine, indexed, extracted into loose files for processing and exposed along with a metadata file as a template in the appropriate location for accessing templates. Such an appropriate location may be, for example, a location that is accessible by a "new project" dialog process which offers users a selection of templates to use in creating a new file or group of files. The location may also be considered appropriate if accessible by any other UI process, such as a "new website" dialog and/or an "add new item" dialog.

FIG. 4 and FIG. 5 illustrate various implementations of template engine processes for creating a template from the group placed in a memory location. In this regard, FIG. 4 and FIG. 5 provide a more detailed view of the process that is generally represented in step 222 of FIG. 2.

Starting with FIG. 4, the template engine, or some other IDE process, may first scan the memory location for a new group 440. Scanning the memory location 440 is one means of detecting that a user has specified that a group is to be converted into a template. As mentioned above, other means for detecting are available, such as allowing a user to pass a name of a group to a template engine, or otherwise conveying to a template engine that a group is to be converted to a template.

An IDE may search certain specified directories for (1) Standard vendor provided or approved templates and (2) User templates. Separate search logic may be applied to each subdirectory. For vendor provided or approved templates, a first directory path may lead to the UI accessible location where the templates are stored, and the directory locations for vendor-provided templates may be not modifiable. For user added templates, a second directory path may lead to the UI accessible location where the templates are stored, and that location may be modifiable.

Once a new user-added group is detected, the template engine can proceed to create a template using the group content. The creation of a template from an existing file or files can entail identifying elements of the file(s) that are desirable to generalize, then indexing the file by determining all the occurrences of the identified elements. For example, it is generally useful to generalize the name of a file. Users do not want to name all files using the same name. Instead, a generic name identifier may be inserted into a template, and the user may be prompted to enter a new file name when creating a file from the template. If there are multiple locations in the file where the name is referenced, the processes that create a file from a template can find these locations—because they are indicated by a parameter and the file is marked for parameter replacement in the metadata file which drives the template engine—and insert the appropriate string—here, the name—into the parametrized locations locations. The appropriate string may be one that is entered by a user into a template dialog. A metadata file is used in conjunction with an indexed file to supply the identifications of the generalized elements. A UI process can reference the metadata file to prompt users to enter values for the generalized elements.

Returning to FIG. 4, a template engine may treat groups that are supplied with tailored metadata differently than groups that are not initially associated with any metadata. This is represented by the decision 441. Tailored metadata is typically generated by a user familiar with the group, and accurately reflects the properties of the group that the user wishes to index. Thus, if a group has an associated metadata file, it is generally preferable to use the supplied metadata instead of generating fresh metadata. Therefore, when a preexisting metadata file is supplied with a group, various embodiments may proceed to detect the existence of the tailored metadata file, to index the group according to the supplied metadata, and to place the group in a UI accessible location 443.

Where no metadata is associated with a group, the template engine may instead proceed to create a metadata file for the group 442. The metadata file may be a skeleton metadata file in a file format such as a .VSTEMPLATE file in VISUAL STUDIO®. The properties of the created metadata file may be based on the project, item, or other file that is being converted to a template. A set of inference rules regarding the elements that should be generalized and indexed may be used. These inference rules can be configured to accomplish a level of generalization that is most likely to provide useful gains to users of the output template. If too many elements of the group are generalized, the usefulness of the template may be reduced due the need to provide excessive customization each time the template is used. On the other hand, if too few elements are generalized, the usefulness of the template may be reduced due the absence of automated features. Also, note that it may be difficult or impossible to accurately generalize many elements using inference rules. Some files may use unconventional element identifiers and thus be difficult to convert to a template without tailored metadata. However, many files use predictable element identifiers, and can thus be indexed according to a set of standardized inference rules.

The following exemplary inference rules may be used to supply an appropriate set of metadata that can be used for indexing a group that corresponds to a project file. The invention is not limited to any particular set of inference rules, and the following are provided by way of useful example only:

| | |
|---|---|
| <Name>: | Name of the project or similar file |
| <Description>: | Description of the project or similar file |
| <Icon>: | Default icon for unspecified icon templates |
| <Language>: | The extension of the project or similar file. |
| <DefaultName>: | Name of the project or similar file |
| <TemplateContent>: | This section is dynamically built based on the contents of the group: |
|   <ProjectFile>: | The name of the project or similar file |
|   <ProjectItems>: | The names of the other items in the project or similar file group. |
|   <ReplaceParameters>: | This tag, which determines whether the file is searched for any parameters to replace, may always be set to FALSE for files without tailored metadata. |

Using the exemplary metadata above, the various files of a group may be indexed. Standard parameter substitution strings may be used in any file in the template. For instance, a typical replacement is to name the namespace in a C# or Visual Basic project with the same name as the project, e.g., "namespace ConsoleApplication1". The "project" name, as that term is used in the context of VISUAL STUDIO® comes from the user input in the dialog when the project is being created from a template. Other common replacements include an item name, again, in the context of VISUAL STUDIO®, a date, a time, a common language runtime version, and so forth.

The following is an example of a metadata file in Extensible Markup Language (XML) that is created using the inference rules set forth above:

```
<VSTemplate Version="2.0.0" Type="Project"
xmlns="http://schemas.microsoft.com/developer/vstemplate/2005"
xmlns:xsi="http://www.w3.org/2001/XMLSchema-instance"
xsi:schemaLocation="http://schemas.microsoft.com/developer/vstemplate/2005">
    <TemplateData>
        <Name Package="{FAE04EC1-301F-11d3-BF4B-00C04F79EFBC}" ID="2320" />
        <Description Package="{FAE04EC1-301F-11d3-BF4B-00C04F79EFBC}" ID="2321" />
        <Icon Package="{FAE04EC1-301F-11d3-BF4B-00C04F79EFBC}" ID="4548" />
```

-continued

```
    <ProjectType>CSharp</ProjectType>
    <DefaultName>ConsoleApplication</DefaultName>
  </TemplateData>
  <TemplateContent>
    <Project File="ConsoleApplication.csproj" ReplaceParameters="true">
      <ProjectItem ReplaceParameters="true"
TargetFileName="Properties\AssemblyInfo.cs">AssemblyInfo.cs</ProjectItem>
      <ProjectItem ReplaceParameters="true" OpenInEditor="true">Program.cs</ProjectItem>
    </Project>
  </TemplateContent>
</VSTemplate>
```

Copyright© Microsoft Corp

The <TemplateData> section of the template will determine how the project appears in the New Project dialog. The following key attributes are examples of those that can be customized: placement under certain language/subcategory, sort order in the user interface dialog, whether the project should be created in its own folder, and other functions. Note that in the above example, the <TemplateData> section is rather sparse. Templates that are generated without any direction from the user may be supplied with a number of default properties, based on likely desires of a user. For instance, a CreateNewFolder property, which may determine whether a project is created in its own folder, may be automatically set to true. This property is used by 90% of project templates, and therefore supplying it as a default property may provide time savings for a user. Also, by customizing tags in the metadata file, the author can customize, for example: what files are in the template, whether a file is opened on template creation, whether, for item templates, any binary references should be added so that the item can build correctly, whether the parameter replacement function should run over the file (if the file has some parameters within it that should be replaced).

A list of other exemplary defaults, in the contexts of project templates and item templates, that may be used in conjunction with the other systems an methods herein is provided in Appendix A and Appendix B.

After indexing a group, such as a project file group, according to metadata that supplies a standard set of inference rules, as set forth above, the completed template can be placed in a UI accessible location for later access and use by a user 444. The reason for adding the template to a UI accessible location is practical, and not required for all embodiments of the invention. In general, users prefer classifying templates in a single location or a small set of locations. That way, templates can be quickly referenced when new file is desired, a determination of a suitable template can be made, and a new file can be instantiated by selecting an appropriate template. If templates are stored individually, the selection of an appropriate template may become more tedious. Various embodiments may display the newly created template in a UI accessible location, such as one identified with opening a new project, a new item, and/or a new file. In a common arrangement, these locations are accessible to dialog processes, i.e., user interface (UI) windows that open when a user indicates a desire to open a new entity (such as a file, project, or item).

FIG. 5 provides a graphical representation of the steps in FIG. 4. An IDE process 551 can scan memory location 550, and convert any file groups therein 554 into templates 555 by creating metadata 553 for the group and placing them in a User Interface (UI) accessible location 552. Note that in various embodiments 550 and 552 may in fact be the same location.

Figure 6:
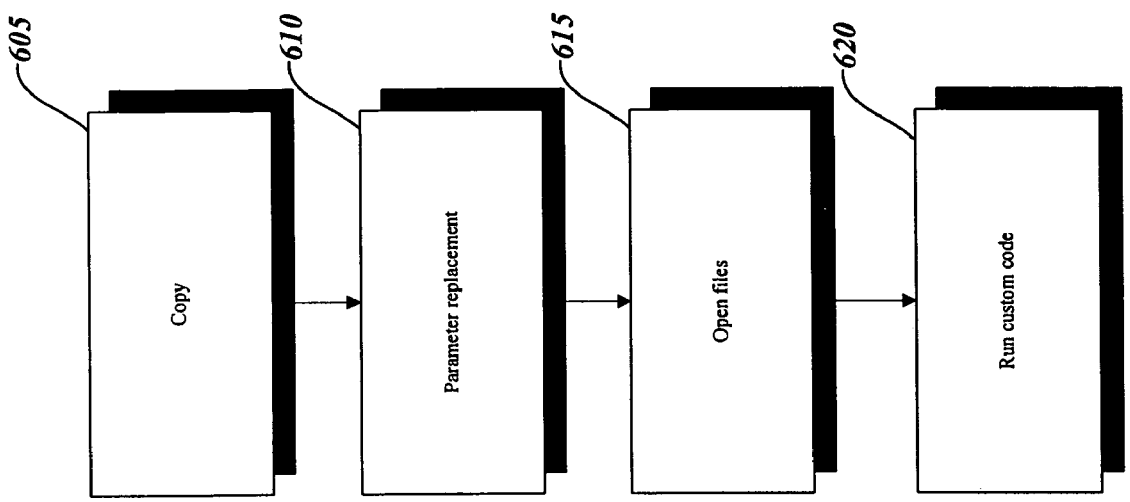
FIG. 6 provides a more detailed view of the last step of FIG. 1B.

Referring next to FIG. 6 shown is a more detailed view of the last step of FIG. 1B. Once a template is clicked on in the UI, the template engine is invoked and the template metadata file and other template files are copied 605 from the UI accessible location 552 of FIG. 5. The template engine reads template metadata file and drives the template creation. This includes parameter replacement 610, opening the template files 615 and running custom code 620.

For parameter replacement 610, the template supports parameter substitution to enable replacement of key parameters such as class names, namespaces, etc. on template instantiation. If the <ReplaceParameters> tag is true on any artifact in a template, the template engine will perform parameter substitution. For example, the format for parameters is $[parameter]$. Following are examples according to this format: $safeprojectname$ $safeclassname$ $guid1$ $guid5$. The library of available parameter replacement options is provided in appendix C. This library may be user-extensible. In one embodiment according to the library provided in appendix C, replacement parameters are case-sensitive.

Once parameter replacement 610 has completed, the template files are opened 615 and any custom code inserted into the metadata file is ran 620 such that a project is set up for the user as the user desired it to be created via the template.

Figure 7:
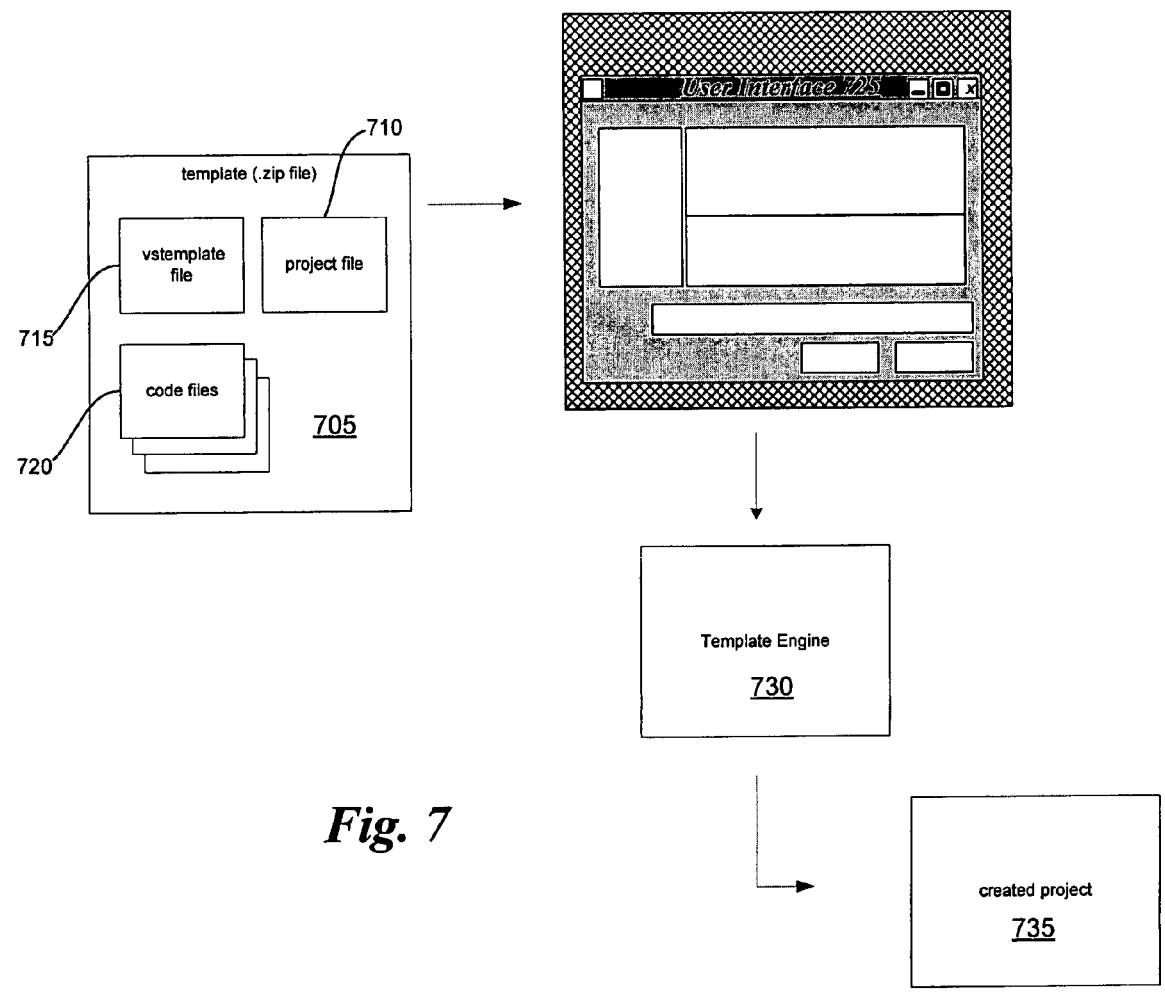
FIG. 7 provides a graphical representation of the process of FIG. 1B showing how a user interface is integrated into the process of creating a template.

Referring next to FIG. 7, illustrated is a graphical representation of the process of FIG. 1B showing how a user interface is integrated into the process of creating a template. Shown is the template zip file 705 which contains the metadata file (in a file format such as a .VSTEMPLATE file in VISUAL STUDIO®, for example), a project file 710 and one or more code files 720. This template file 705 is included in an index of all template files and displayed in a UI 725 such that a user may select a desired template. Once a user clicks on the desired template, the template engine 730 is invoked and the metadata file 715 is read to create the project 735 according to the specifications of the metadata file 715.

The simplified structure of the templates makes it easy for users to modify them at will. The modification may include, for example, inserting custom code so that the user can set up certain code blocks and putting comments or files inside existing templates which they use frequently and which are more useful if tailored to individual needs. Templates may also be stored in one or more specified locations for easy access by users. Also, a differentiation may be made between user-created templates and pre-defined templates that may come with a software package or IDE that are modifiable by a user. The user-created templates and the pre-defined templates may be stored in different locations defined for that type of template. This is reflected in the UI for selection of templates such as in FIG. 8, where the VISUAL STUDIO® installed templates are categorized and displayed in a different area in the VISUAL STUDIO® New Project dialog UI from the user-created templates (i.e., the "My Templates" section in FIG. 8). Also, templates for particular types of objects may have their own defined location corresponding to that type of object. For example, project templates may be stored in a different location than item templates. For example, in VISUAL STUDIO®, project templates and item template may be stored in the following separate locations:
Project Templates—%systemdrive%\ProgramFiles\MicrosoftVisualStudio.NETWhidbey\ProjectTemplates\[Language]
Item Templates—%systemdrive%\ProgramFiles\MicrosoftVisualStudio.NETWhidbey\ItemTemplates\[Language]

The user may also customize the appearance of the UI for selection of the templates by adding folder structures under a top-level language node. This is handy for organization when a user has many templates.

In addition, the designation and search of a user-specifiable set of directories for template content is included. This is extremely useful for adding new templates. Users can access these directories without requiring admin or power user privileges which are required to access the Program Files directory in the MICROSOFT WINDOWS® operating system. For example, the default directory path in VISUAL STUDIO® for user-added templates is:
Project Templates—%MyDocuments%\%User%\VisualStudio\ProjectTemplates\[Language]
Project Item Templates—%MyDocuments%\%User\%\VisualStudio\ItemTemplates\[Language]

Figure 9:
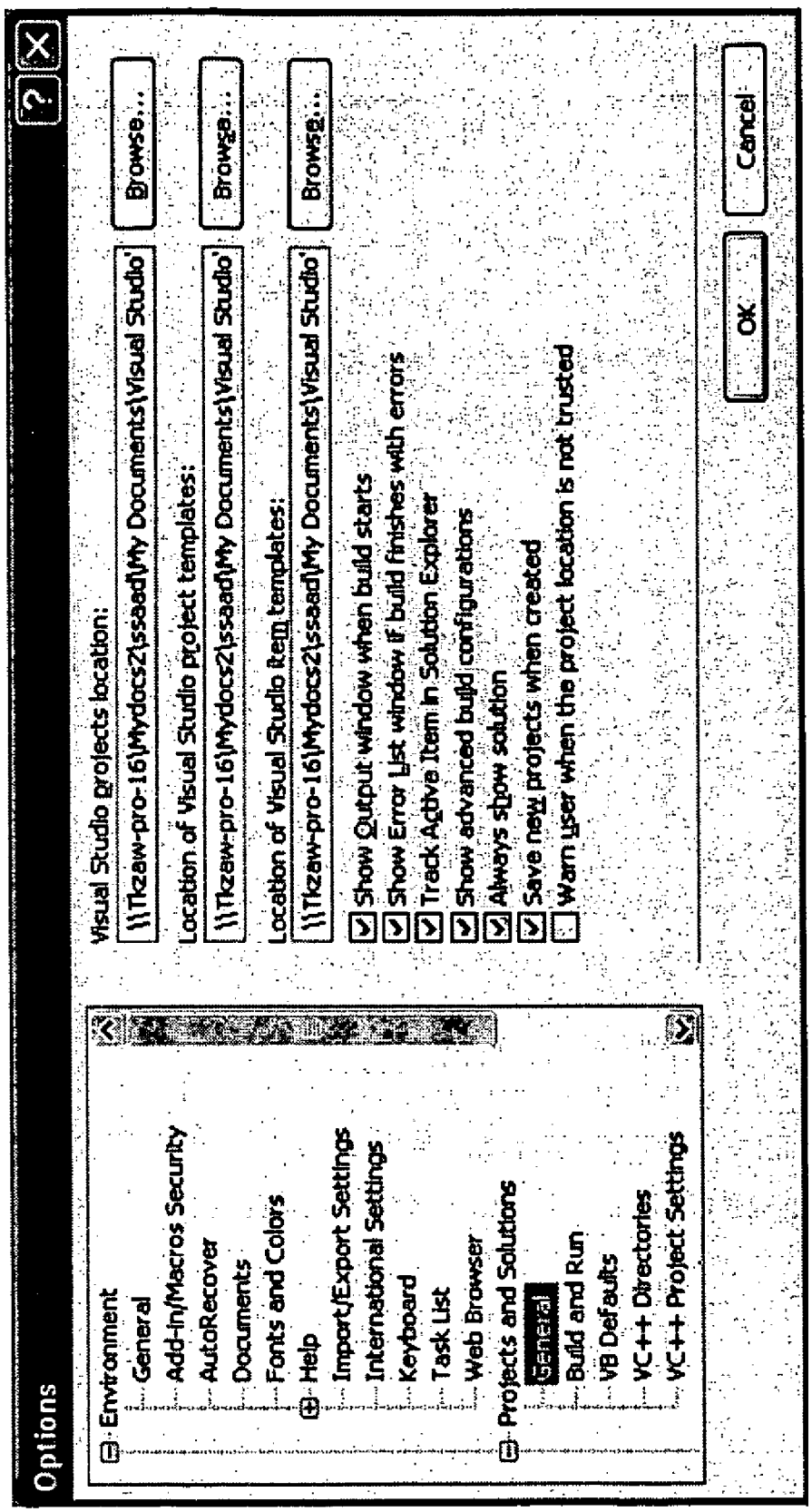
FIG. 9 is an exemplary screenshot showing how customization of template locations is implemented in the UI of MICROSOFT VISUAL STUDIO® according to an embodiment of the present invention.

The location for picking up these templates may also be customized by users to point at any location. This can be user-specific for individual user customizations or to point at a single share for a team, allowing a team to share a block of templates together and commonly leverage a set of template components. An example showing how customization of template locations is implemented in the UI for VISUAL STUDIO® is provided in FIG. 9.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

APPENDIX A

| Element | Defaults for Project Templates | |
|---|---|---|
| | Default | Description |
| [Icon] Filepath | Default System-cached Project Template Icon | Relative path to the .ico file |

APPENDIX A-continued

Defaults for Project Templates

| Element | Default | Description |
|---|---|---|
| SortOrder | Alphabetical | Template order in NPD. User templates may have alphabetical sort order. |
| CreateNewFolder | True | Whether a containing folder is created on instantiation |
| DefaultName | <Name> | The DefaultName in the Name file in the NPD, ex: ClassLibrary |
| ProvideDefaultName | False | Whether to provide a default DefaultName for the project in the name field |
| PromptForSaveOnCreation | True | Whether the project supports being a 'temporary' in-memory project |
| EnableLocationBrowseButton | True | Whether the user can browse to a different directory to create the solution |
| LocationField | Enabled | Whether the location field is enabled, disabled or hidden. Values: Enabled Disabled Hidden |
| Hidden | False | Specifies that the template should not appear in the New Project Dialog. If specified, no other elements inside <TemplateData> need be required |

Copyright© Microsoft Corp

APPENDIX B

Defaults for Item Templates

| Element | Default | Description |
|---|---|---|
| [Icon] Filepath | Default System-cached Item Template Icon | Relative path to the .ico file |
| SortOrder | Alphabetical | Template order in ANID. User templates may have alphabetical sort order. |
| DefaultName | <Name> | The DefaultName in the Name file in the ANID, ex: Class |
| AppendDefaultExtension | True | If set to true, may create the target new file(s) with the same extension as the source files, ignoring what the user may have typed in the Add New Item dialog. (I.e., If user is creating C# class file and types "Foo.vb", may be created as "Foo.cs" |
| SupportsMasterPage | False | Whether the template supports having a master page (Web option) |
| SupportsCodeSeparation | False | Whether the template supports code separation (Web option) |
| SupportsLanguageDropdown | False | Whether the template is identical for multiple languages and a language dropdown can appear. |
| Hidden | False | Specifies that the template should not appear in the New Project Dialog. If specified, no other elements inside <TemplateData> need be required |

APPENDIX C

Defaults for Project Templates

| Parameter | Description |
| --- | --- |
| itemname | The user-provided name of an item for an item template being added to a project. Used to replace classnames in Class file templates Form file templates, etc, i.e. Public Class Class1 |
| safeitemname | The user-provided name of the item with all unsafe characters and spaces removed. |
| saferootitemname | The name of the root item. Use for multi-file items when the root item name (the user-entered name) should be used for all parameter replacements, e.g. for Form templates which contain Form.cs and Form.desginer.cs. |
| guid [1-10] | A guid. Used to replace the project GUID in a project file. User can specify up to 10 unique GUIDs. Example: guid1 |
| projectname | The user-provided name of the project for a project template. |
| safeprojectname | The user-provided name of the project for a project template with all unsafe characters and spaces removed. Used to replace the namespace and the name of the main class in some templates, i.e. NameSpace WindowsApplication1. |
| rootnamespace | The root namespace of a project for an item template being added to a project. Used to replace the namespace in the item file, i.e. Namespace WindowsApplication1 |
| Time | The current time (Format: DD/MM/YYYY 00:00:00). |
| Year | The current year (Format: YYYY). |
| username | The current username (Ex: CraigS). |
| userdomain | The current user domain (Ex: REDMOND). |
| machinename | The current machinename (Ex: VISUALSTUDIO1). |
| clrversion | Current version of the CLR |
| registeredorganization | The registry key value from: HKLM\Software\Microsoft\Windows NT\CurrentVersion\RegisteredOrganization. Used for the company name field in AssemblyInfo.vb. |

Copyright© Microsoft Corp

What is claimed:

1. A method for generating and executing a template for creating data comprising:

detecting at least one file upon which the template will be based by scanning a predetermined memory location where the at least one file is stored;

if a tailored metadata file is not provided, creating a metadata file associated with the template and the data, wherein the metadata file is coded at least in part in a declarative programming language, the metadata file including three sections, a TemplateData section that defines an appearance of the template, a TemplateContent section that defines content and creation parameters of the template and a ReplaceParameters section, wherein the metadata file provides information regarding the template contents and template creation process and wherein the metadata file determines whether the data to be created will be created in a separate folder for the data, wherein the metadata file is created by using inference rules to index the at least one file by determining elements of the at least one file to be generalized;

packaging a project file and at least one code file and the associated metadata file into a single transferable file;

storing the single file in a UI ("User Interface") accessible location based upon whether the template is a user-created template, a pre-defined template, an item template or a project template;

displaying an identifier for the single file in a customized UI, wherein the UI is customized based upon whether the template is a user-created template, a pre-defined template, an item template or a project template;

upon receiving an indicator of selection of the template from the index:

if the ReplaceParameters section indicates a true status, performing parameter substitution;

executing the at least one code file;

creating a project according to specifications of the metadata file.

2. The method according to claim 1 wherein, via tags in the metadata file, the metadata file determines what files are in the template.

3. The method according to claim 1 wherein, via tags in the metadata file, the metadata file determines whether a file is opened on template creation.

4. The method according to claim 1 wherein, via tags in the metadata file, the metadata file determines whether, for item templates, any binary references should be added so that the item can build correctly.

5. The method according to claim 1 wherein, via tags in the metadata file, the metadata file determines whether a parameter replacement function should run over the metadata file based on the metadata file having some parameters which should be replaced.

6. A method for using templates having associated metadata files, the method comprising:

parsing all the metadata files;

storing a single file for each template in a UI ("User Interface") accessible location based upon whether the template is a user-created template, a pre-defined template, an item template or a project template;

building an index of all the templates;

displaying the index in a customized UI, wherein the UI displays an identifier for a template in a format depending upon whether the respective template is a user-created template, a pre-defined template, an item template or a project template;

receiving a selection of a template from the index;

invoking a template engine based upon the selection of the template from the index, the template engine causing reading of a metadata file associated with the selected template, the metadata file including three sections, a TemplateData section that defines an appearance of the selected template, a TemplateContent section that defines content and creation parameters of the selected template and a ReplaceParameters section, wherein the metadata file provides information regarding the template contents and template creation process and wherein the metadata file determines whether data to be created will be created in a separate folder for the data, wherein the metadata file is created by using inference rules to index at least one file by determining elements of the at least one file to be generalized;

performing parameter substitution to enable replacement of key parameters on template instantiation;

creating a project according to specifications of the metadata file.

7. A method according to claim 6 wherein each template corresponds to a project in an integrated development environment (IDE).

8. A tangible readable storage medium comprising computer executable instructions for performing the method of claim 6.

9. A computing device comprising at least one computer executable module for performing the method of claim 6.

10. A method according to claim 6 wherein the metadata files are coded at least in part in a declarative programming language and are modifiable by an end user.

11. A system for using templates having associated metadata files, said system comprising:

a computer; and at least one subsystem coupled to the computer for:

parsing each of a plurality of metadata files, wherein each metadata file is associated with a template, wherein at least one of the metadata files determines an associated template's placement under a certain subcategory;

storing a single file for each template in a UI ("User Interface") accessible location comprising an associated template and associated code data based upon whether the template is a user-created template, a pre-defined template, an item template or a project template;

building an index of all the templates;

displaying the index in a customized UI, wherein the UI displays an identifier for each template in a format depending upon whether the respective template is a user-created template, a pre-defined template, an item template or a project template;

receiving a selection of a template from the index;

invoking a template engine upon the selecting of the template from the index, the template engine causing reading of a metadata file associated with the selected template, the metadata file including three sections, a TemplateData section that defines an appearance of the selected template, a TemplateContent section that defines content and creation parameters of the selected template and a ReplaceParameters section, wherein the metadata file provides information regarding the template contents and template creation process and wherein the metadata file determines whether data to be created will be created in a separate folder for the data, wherein the metadata file is created by using inference rules to index at least one file by determining elements of the at least one file to be generalized;

creating a project according to specifications of the metadata file; performing parameter substitution to enable replacement of key parameters on template instantiation.

12. A system according to claim 11 wherein each template corresponds to a project in an integrated development environment (IDE).

13. A system according to claim 11 wherein the metadata files are coded at least in part in a declarative programming language.

14. A system according to claim 11 wherein at least one of the metadata files is written at least in part in XML.

15. A system according to claim 11 wherein at least one of the metadata files determines an associated template's sort order in a user interface used to select the associated template.

16. A system according to claim 15 wherein the metadata file is written at least in part in XML.

* * * * *